United States Patent Office 3,726,881
Patented Apr. 10, 1973

3,726,881
N-AMINOXY-ACETYL-N'-ISONICOTINOYL-HYDRAZINE AND THE PHARMACEUTICALLY ACCEPTABLE SALTS THEREOF
Lajos Kisfaludy, Agnes Patthy, nee Lukats, Lajos Dancsi, Gyorgy Fekete, and Istvan Szabo, Budapest, Hungary, assignors to Richter Gedeon Vegyeszeti Gyar Rt., Budapest, Hungary
No Drawing. Filed Dec. 28, 1970, Ser. No. 102,226
Int. Cl. C07d 31/44
U.S. Cl. 260—295 AM        1 Claim

ABSTRACT OF THE DISCLOSURE

N,N'-diacyl hydrazine derivatives having tuberculostatic activity and corresponding to the general formula

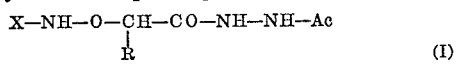
(I)

wherein X represents hydrogen or an acyl radical, R represents hydrogen or a substituted or unsubstituted alkyl, aralkyl or aryl group, and Ac is the acyl radical of a substituted or unsubstituted aliphatic, aromatic or heterocyclic carboxylic acid, as well as the pharmaceutically acceptable acid addition salts thereof and/or the optically active isomers of such compound containing an asymmetric carbon atom.

The invention relates to the preparation of novel N,N'-diacyl-hydrazine derivatives of tuberculostatic activity.

Among the tuberculostatically active compounds, a very important place is taken by certain hydrazides, in view of the fact that the isonicotinic acid hydrazide is considered up to now as the most potent antituberculotic agent. On the other hand, the bacteriostatic effect of aminoxy-acetic acid is known for a long time [cf. C. B. Favour, Bacteriol. 55, 1 (1948)]; the effect of this compound was examined in more detail, however, only since it has been discovered that the cycloserine, which contains the aminoxy group closed into a ring, is an important drug in the therapy of human tuberculosis [cf. F. A. Kuel, etc. J. Am. Chem. Soc. 77, 2344 (1955); P. H. Hidy, etc., J. Am. Chem. Soc,. 77, 2346 (1955)]. Numerous further open-chain aminoxy compounds have been described later [cf. McHale, etc., J. Chem. Soc. (1960), 225; P. Mamalis, etc., J. Chem. Soc. (1960), 229; A. Frank, K. Riede, Monatshefte Chem. 92, 725 (1961); E. Tesla etc., Helv. Chim. Acta 46, 766 (1963); P. Mamalis, etc. J. Med. Chem. 6, 684 (1965); V. Markova etc.; Khim. Farm. Zh. 3, 13 (1969)], and their effects on various micro-organisms have been investigated [cf. S. A. Price, etc., Brit. J. Pharm. 15, 243 (1960)], but no compound having a potent activity against Mycobacterium tuberculosis could be found in this family of aminoxy derivatives.

It has been found now surprisingly that the simple α-aminoxy-carboxylic acid hydrazides not described in the literature hitherto and characterized by the general Formula I

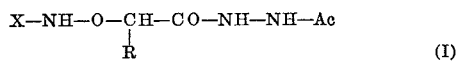
(I)

wherein X represents hydrogen or an acyl radical, R represents hydrogen or a substituted or unsubstituted alkyl, aralkyl or aryl group, and Ac is the acyl radical of a substituted or unsubstituted aliphatic, aromatic or heterocyclic carboxylic acid, as well as the therapeutically acceptable acid addition salts thereof and/or the optically active isomers of such compounds containing an asymmetric carbon atom, have very favourable tuberculostatic effects.

In the compounds of the general Formula I according to the present invention X represents mostly hydrogen, it may, however, represent also an acyl radical, possibly containing also a group capable to form salts.

The compounds containing hydrogen in the place of R are aminoxy-acetic acid hydrazides, whereas those in which R is different from hydrogen, are α-aminoxy-carboxylic acid hydrazides containing an asymmetrical carbon atom and can thus exist in optically active forms. The symbol Ac represents in accordance with the above definition mainly the acyl radical of a heterocyclic carboxylic acid, but it may represent the acyl radical e.g. of an amino acid or an amino-aryl carboxylic acid too.

The new compounds of the general Formula I of the invention may be prepared in various ways. So e.g. an α-aminoxy-carboxylic acid derivative of the general Formula II

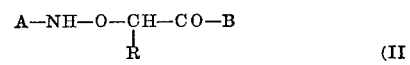
(II)

wherein A represents an acyl radical, or if in the desired reaction product X represents hydrogen, then A can be a protective group apt for the temporary protection of the amino group, as e.g. a benzyloxy-carbonyl or tert.-butyloxycarbonyl group, R has the same meaning as above, and B represents a hydroxyl group or a group capable to activate the carboxyl group, e.g. a pentachlorophenoxy group, a halogen atom or an azido group, is reacted with a hydrazide of the general Formula III

H₂N—NH—Ac        (III)

wherein Ac has the same meaning as above.

According to another method, an α-aminoxycarboxylic acid hydrazide of the general Formula IV

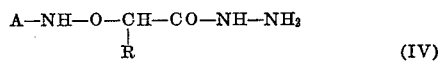
(IV)

wherein A and R have the same meanings as above, is reacted with a carboxylic acid derivative of the general Formula V

Ac—B        (V)

wherein Ac and B have the same meaning as above.

The compound of the general Formula VI obtained by the above methods

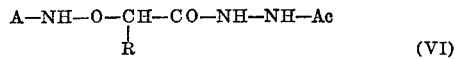
(VI)

wherein A, R and Ac have the same meanings as above, may be converted by splitting off the protective group A in a per se known manner and replacing it by the desired acyl group X into the end product of the general Formula I or into a therapeutically acceptable acid addition salt thereof. If the acyl group Ac is the acyl radical of a carboxylic acid, containing also itself a group to be temporarily protected, e.g. an amino group, this may be protected preferably by the same protective group A which has been used to protect the amino group of the starting compound, in order to ensure the uniform progress of the reaction.

The compounds of the general Formula I obtained by the methods described above from racemic starting compounds of the Formula II or IV, respectively, may be resolved by per se known methods into the optical enantiomers.

In preparing the compounds of the general Formula VI, either by reacting a compound of the Formula II with one of the Formula III, or by reacting a compound of the Formula IV with one of the Formula V, the starting materials are reacted in an organic solvent, preferably in dimethylformamide, at room temperature.

The reaction mixture can be easily worked up, because after removing the solvent from the reaction mixture the desired product can be crystallized easily from the residual mixture by the aid of an organic solvent or of a mixture of a water miscible organic solvent with water.

The compound of the general Formula VI is then treated—according to the nature of the protective group—with hydrogen bromide in glacial acetic acid or with ethyl acetate saturated by hydrogen chloride, whereby the protective group is split off and simultaneously the corresponding salt of the end product of the Formula I is formed, which is insoluble in ether and can be thereby easily precipitated from the reaction mixture.

According to an especially preferred way of performance of the process, tert.butyloxycarbonyl or carbobenzoxy protective groups are used for the temporary protection of the amino group of the starting α-aminoxy-carboxylic acid derivative, and the activation of the carboxyl group is achieved by converting it into pentachlorophenyl ester. In this way the compound of the general Formula VI is obtained with excellent yields. In case of standing in the place of Ac an acid radical containing also a basic group—e.g. if Ac is an isonicotinoyl group—the pentachlorophenolate of the compound of the Formula VI is formed in this way; this is a stable salt which can be isolated and purified easily and so the recovery of the compound is considerably facilitated.

The compound of the Formula VI can be converted in a per se known manner by acid treatment into the end product of the general Formula I. Depending on the reaction conditions applied, the compounds of the general Formula I are obtained in the form of free bases or of salts. From the salts obtained, the bases may be liberated in per se known manner, and the bases may be converted into acid addition salts, formed preferably with therapeutically acceptable acids.

In experiments carried out in vitro, numerols compounds of the general Formula I prepared according to the invention, inhibited considerably the growth of the strain $H_{37}R_v$ of Mycobacterium tuberculosis as well as the growth of strains resistant to isonicotinic acid hydrazide, p-aminosalicylic acid and streptomycin. The extent of inhibition is especially marked in the case of the compound described in Example 1, where the inhibiting concentration was lower than 0.1 mg./ml. The tests performed in vivo on guinea-pigs and on white mice, confirmed the in vitro established effectiveness of the said compound. The guinea-pigs have been infected subcutaneously by 0.01 mg. of bacteria (calculated on wet weight). The drug treatment has been commenced on the next day after the infection and has been performed by oral administration of the compound in doses of 3 to 7 mg./kg. during 90 days. When dissecting the animals, the pathological lesions of five organs have been evaluated and recorded by the figures 0 to 5, according to the gravity of the lesion. The average value shown by the animals of the control group was 15.5, while the treated animals have shown an average value of 3.1. The compounds tested inhibited in doses of 7 mg./kg. virtually completely the generalization of the infection by Mycobacteria. In the case of the tests performed on white mice, the grade of lesion of the lungs has been recorded after the necrotomy. The animals of the untreated control group have shown an average lung-index of 4.2, while the value obtained with the animals treated by doses of 15 mg./kg. has been 0.4. A further control group treated with similar doses of viomycin has shown a lung-index of 2.08. On the basis of the above experimental results, the tuberculostatic activity of the compound described in Example 1, (N-aminoxy-acetyl - N' - isonicotinoyl-hydrazine) is of the same order as that of the most potent antituberculotic drugs. To establish the toxicity of the said compound in a preliminary experiment, guinea-pigs were fed for three months with doses of 15 mg./kg. daily, then the animals were killed and histological section fixed with formol were made of the livers, kidneys, lungs, heart-muscles and spleens, and these were examined after the usual hematoxylin-eosine staining. The histological examination revealed no lesions.

For therapeutical purposes, the compounds of the general Formula I may be administered orally and/or parenterally, in the form of tablets, dragées, injections, infusions or suppositories. The daily doses for adult persons may be 7 to 50 mg./kg.

The preparation of the new compound is illustrated in more details by the following examples. The $R_f$ values given in the examples have been established by thin layer chromatography on silica gel layer, in the solvent system n-hexane-glacial acetic acid-chloroform 1:1:8, the chromatograms have been developed with chlorine and toluidine. The chemical structures of the compounds described in the examples have been checked occasionally also by IR or NMR spectroscopy.

EXAMPLE 1

(a) N-(N''-benzyloxycarbonyl-aminoxy-acetyl)-N'-isonicotinoyl hydrazine ($a_1$) 4.73 g. (10 mmol.) of N-benzyloxycarbonyl-aminoxy-acetic acid pentachlorophenyl ester are dissolved in 50 ml. of abs. dimethyl formamide, 1.37 g. (10 mmol.) of isonicotinic acid hydrazide are added thereto and the mixture is allowed to stand overnight. The solvent is then distilled off under reduced pressure and the residue is crystallized from ethanol. The pentachlorophenolate salt of N-(N''-benzyloxycarbonyl-aminoxy-acetyl)-N'-isonicotinoyl hydrazine is obtained, yield: 5.37 g. (88%); M.P. 160–162° C.; $R_f$=0.18.

*Analysis.*—Calculated (percent): C, 43.3; H, 2.7; Cl, 29.1. Found (percent): C, 43.3; H, 2.8; Cl, 29.1.

The salt prepared in this way is subjected to partition between 25 ml. of ethyl acetate and 15 ml. of N-hydrochloric acid, the aqueous layer is neutralized by adding NaHCO$_3$, and then allowed to stand cold. The precipitated product is separated by filtration and recrystallized from 50% ethanol. 2.64 g. (87%) of N-(N''-benzyl-oxycarbonyl-aminoxy-acetyl)-N'-isonicotinoyl-hydrazine are obtained; M.P. 112–113° C.; $R_f$=0.18.

*Analysis.*—Calculated (percent): C, 55.8; H, 4.7; N, 16.3. Found (percent): C, 55.8; H, 4.9; N, 16.3.

($a_2$) 2.15 g. (9 mmol.) of N-benzyloxycarbonyl-aminoxy-acetic acid hydrazide are dissolved in 30 ml. of abs. dimethylformamide, 3.34 g. (9 mmol.) of isonicotinic acid pentachlorophenyl ester are added thereto and the reaction mixture is allowed to stand overnight. The solvent is then distilled off under reduced pressure and the residue is recrystallized from ethanol. 3.62 g. (66%) of the pentachlorophenolate salt are obtained, the physical characteristics of the product are the same as in paragraph ($a_1$); this salt can be converted into N-(N''-benzyl-oxycarbonyl-aminoxy-acetyl)-N-isonicotinoyl - hydrazine by the method described in paragraph ($a_1$).

($a_3$) 2.25 g. (10 mmol.) of N-benzyloxycarbonyl-aminoxy-acetic acid are dissolved in 20 ml. of dimethyl formamide and 1.37 g. (10 mmol.) of isonicotinic acid hydrazide and then 2.06 g. (10 mmol.) of dicyclohexyl carbodiimide are added to the stirred and cooled solution and the mixture is further stirred for one day at room temperature. The dicyclohexyl urea is filtered off and the filtrate is evaporated to dryness under reduced pressure. The residue is crystallized from aqueous methanol. 2.26 g. (66%) of N-(N''-benzyloxycarbonyl-aminoxy-acetyl)-N'-isonicotinoyl hydrazine are obtained; the physical characteristics of the product are the same as in paragraph ($a_1$).

(b) N-(N''-tert.-butyloxycarbonyl-aminoxy-acetyl)-N'-isonicotinoyl hydrazine ($b_1$) 4.39 g. (10 mmol.) of N-tert.-butyloxycarbonyl-aminoxy-acetic acid pentachlorophenyl ester are dissolved in 50 ml. of dimethylformamide, 1.37 g. (10 mmol.) of isonicotinic acid hydrazide are added thereto and the reaction mixture is allowed to stand overnight. The solvent is then distilled off under reduced pressure, the residue is subjected to partition between 50 ml. of ethyl acetate and 30 ml. of N hydrochloric acid at 0° C. The product precipitated by neutralization of the aqueous layer is then extracted into ethyl acetate, the solution is dried and the solvent is distilled off. The residue is crystallized from ethyl acetate. 2.36 g. (76%) of N-(N''-tert.-butyloxycarbonyl-aminoxy-acetyl)-N'-isonicotinoyl-hydrazine are obtained; M.P. 168–169° C.; $R_f=0.16$.

*Analysis.*—Calculated (percent): C, 50.3; H, 5.9; N, 18.0. Found (percent): C, 50.1; H, 6.1; N, 18.1.

($b_2$) 1.91 g. (10 mmol.) of N-tert.-butyloxy-carbonyl-aminoxy-acetic acid are dissolved in 20 ml. of abs. dimethyl formamide, 1.37 g. (10 mmol.) of isonicotinic acid hydrazide and 2.06 g. (10 mmol.) of dicyclohexyl carbodiimide are added to the stirred solution and the stirring is continued further for 24 hours. After filtering off the dicyclohexyl urea precipitated, the filtrate is evaporated to dryness under reduced pressure and the residue is crystallized from ethyl acetate. 2.28 g. (61%) of N-(N''-tert.-butyloxycarbonyl-aminoxy-acetyl) - N' - isonicotinoyl-hydrazide are obtained, the physical characteristics of this product are the same as in paragraph ($b_1$).

(c) N-aminoxy-acetyl-N'-isonicotinoyl-hydrazine-dihydrobromide 97.0 g. (159 mmol.) of N-(N''-benzyloxy-carbonyl-aminoxy-acetyl)-N-isonicotinoyl - hydrazine pentachlorophenolate salt are suspended in 250 ml. of glacial acetic acid and 250 ml. of a 4 M solution of hydrobromic acid in glacial acetic acid are added thereto under stirring and excluding the air humidity. After further stirring for one hour, 4.5 liters of dry ether are added to the reaction mixture. The precipitate is collected by filtration, washed with ether, then dissolved in 750 ml. of abs. methanol and crystallized by adding 1 liter of ether. 58.0 g. (98%) of the di-hydrobromide salt of N-aminoxy-acetyl-N'-isonicotinoyl-hydrazine are obtained; M.P.: 166–167° C.

*Analysis.*—Calculated (percent): C, 25.8; H, 3.2; N, 15.1; Br, 43.0. Found (percent): C, 25.8; H, 3.3; N, 15.2; Br, 42.9.

(d) N-aminoxy-acetyl-N'-isonicotinoyl-hydrazine dihydrochloride 1.6 g. (5.2 mmol.) of N-(N''-tert.-butyloxycarbonyl-aminoxy-acetyl) - N' - isonicotinoyl-hydrazine are suspended in 7.0 ml. of dry ethyl acetate, and 8.0 ml. of a 4 M solution of hydrogen chloride in ethyl acetate are added at 20° C. to the stirred suspension. After stirring for further 30 minutes 80 ml. of dry ether are added to the reaction mixture, the precipitated product is collected by filtration, washed with ether and then recrystallized from methanol. 1.28 g. (87%) of the di-hydrochloride salt of N-aminoxy-acetyl - N' - isonicotinoyl-hydrazine (87%) are obtained; M.P.: 182–184° C.

*Analysis.*—Calculated (percent): C, 33.9; H, 4.3; Cl, 25.1. Found (percent): C, 34.0; H, 4.3; Cl, 25.0.

EXAMPLE 2

(a) N,N'-di-(N''-benzyloxycarbonyl-aminoxy-acetyl)-hydrazine 2.36 g. (5 mmol.) of N-benzyloxycarbonyl-aminoxy-acetic acid pentachlorophenyl ester are dissolved in 25 ml. of abs. dimethyl formamide, 0.17 ml. (2.5 mmol.) of hydrazine hydrate are added to the stirred and cooled solution and the reaction mixture is allowed to stand overnight. The solvent is then distilled off under reduced pressure and the residue is treated with ether and crystallized from ethanol. 0.8 g. (72%) of N,N'-di-(N''-benzyloxycarbonyl-aminoxy-acetyl) - hydrazine are obtained, M.P. 164–166° C.; $R_f=0.92$.

*Analysis.*—Calculated (percent): C, 53.8; H, 5.0. Found (percent): C, 53.7; H, 4.9.

(b) N,N'-di-(aminoxy-acetyl)-hydrazine di-hydrobromide

This compound was prepared from 3.2 g. of N,N'-di-(N''-benzyloxycarbonyl-aminoxy-acetic acid hydrazide by the method described in Example 1(c). 2.3 g. (94%) of N,N'-di-(aminoxy-acetyl) - hydrazine di - hydrobromide were obtained; M.P. 178–180° C. (from ethanol/ether).

*Analysis.*—Calculated (percent): C, 14.2; H, 3.6; N, 16.5; Br, 46.7. Found (percent): C, 14.2; H, 3.7; N, 16.4; Br, 46.8.

EXAMPLE 3

(a) N-(N''-benzyloxycarbonyl-glycyl)-N'-(N'''-benzyloxycarbonyl-aminoxy-acetyl)-hydrazine ($a_1$) This compound was prepared from 2.0 g. of N-benzyloxycarbonyl-glycine hydrazide and 3.78 g. of N-benzyloxycarbonyl - aminoxy - acetic acid pentachlorophenyl ester, by the method described in Example 1($a_1$). 3.34 g. (97%) of N-(N''-benzyloxycarbonyl-glycyl)-N'-(N'''-benzyloxycarbonyl-aminoxy-acetyl)-hydrazine were obtained; M.P. 148–149° C. (from ethanol); $R_f=0.12$.

*Analysis.*—Calculated (percent): C, 55.8; H, 5.2. Found (percent): C, 55.7; H, 5.3.

($a_2$) The same compound has been prepared also from 1.0 g. of N-benzyloxycarbonyl-amino-acetic acid hydrazide and 1.74 g. of N-benzyloxycarbonyl-glycine pentachlorophenyl ester by the method described in Example 1 ($a_2$). 1.25 g. (72%) of the above product were obtained, having the same physical characteristics as described in paragraph ($a_1$).

(b) N-glycyl-N'-aminoxy-acetyl-hydrazine di-hydrobromide

This compound was prepared from 1.05 g. of N-(N''-benzyloxycarbonyl-glycyl)-N - (N''' - benzyloxycarbonyl-aminoxy-acetyl)-hydrazine by the method described in Example 1(c). 0.71 g. (90%) of N-glycyl-N'-(aminoxy-acetyl)-hydrazine di-hydrobromide was obtained; M.P. 179–184° C. (from methanol/ether).

*Analysis.*—Calculated (percent): C, 14.8; H, 3.8; Br, 49.4. Found (percent): C, 14.9; H, 3.9; Br, 49.2.

EXAMPLE 4

(a) N-(N''-benzyloxycarbonyl-L-alanyl)-N'-(N'''-benzyloxycarbonyl-aminoxy-acetyl)-hydrazine This compound was prepared from 11.82 g. of N-benzyloxycarbonyl-aminoxy-acetic acid pentachlorophenyl ester and 6.4 g. of N-benzyloxycarbonyl-L-alanine hydrazide by the method described in Example 1 ($a_1$). 7.92 g. (71%) of N-(N''-benzyloxycarbonyl-L-alanyl)-N'-(N''' - benzyloxycarbonyl-aminoxy-acetyl) - hydrazine were obtained, M.P. 185–186° C.; $R_f=0.7$.

*Analysis.*—Calculated (percent): C, 56.8; H, 5.4. Found (percent): C, 56.9; H, 5.5.

(b) N-L-alanyl-N'-aminoxy-acetyl-hydrazine di-hydrobromide

This compound was prepared from 3.0 g. of N-(N''-benzyloxycarbonyl-L-alanyl) - N' - (N''' - benzyloxycarbonyl-aminoxy-acetyl)-hydrazine by the method described in Example 1(c). 2.1 g. (92%) of N-L-alanyl-N'-aminoxy-acetyl-hydrazine di-hydrobromide were obtained; M.P. 108–110° C. (from ethanol/ether).

*Analysis.*—Calculated (percent): C, 17.7; H, 4.2; Br, 47.3. Found (percent): C, 17.8; H, 4.1; Br, 47.2.

EXAMPLE 5

(a) N-(N''-tert.-butyloxycarbonyl-aminoxy-acetyl)-N'-(N'''-tert.-butyloxycarbonyl-L-seryl)-hydrazine This compound was prepared from 3.94 g. of N-tert.-butyloxycarbonyl-aminoxy-acetic acid pentachlorophenyl ester and 2.19 g. of N-tert.-butyloxycarbonyl-L-seryl-hydrazine by the method described in Example 1($b_1$). 3.4 g. (87%) of N-(N''-tert. - butyloxycarbonyl - aminoxy-acetyl)-N'-(N'''-tert.-butyloxycarbonyl - L - seryl) - hydrazine were obtained; M.P. 118° C. (from methanol); $R_f=0.1$.

*Analysis.*—Calculated (percent): C, 45.9; H, 7.2; N, 14.3. Found (percent): C, 46.0; H, 7.4; N, 14.4.

(b) N-L-seryl-N'-(aminoxy-acetyl)-hydrazine dihydrobromide

This compound was prepared by treating 3.15 g. of the product described in Example 5(a) with a 4 M solution of hydrobromic acid in trifluoroacetic acid, by the method described in Example 1(d). 1.98 g. (81%) of N-L-seryl-N'-(aminoxy-acetyl)-hydrazine di - hydrobromide were obtained; M.P. 139–141° C. (from ethanol/ether).

*Analysis.*—Calculated (percent): C, 20.0; H, 4.0; Br, 45.2. Found (percent): C, 20.1; H, 4.1; Br, 45.2.

EXAMPLE 6

(a) N-(N''-benzyloxycarbonyl-aminoxy-acetyl)-N'-(N'''-benzyloxycarbonyl-L-phenylalanyl)-hydrazine This compound was prepared from 4.25 g. of N-benzyloxycarbonyl-amioxy-acetic acid pentachlorophenyl ester and 3.2 g. of N-benzyloxycarbonyl-L-phenyl-alanyl-hydrazine, as described in Example 1a₁). 4.19 g. (81%) of N-(N''-benzyloxycarbonyl-aminooxy-acetyl) - N - (N'''-benzyloxycarbonyl-L-phenylalanyl) - hydrazine were obtained; M.P. 199–200° C. (ethanol); $R_f=0.35$.

*Analysis.*—Calculated (percent): C, 62.3; H, 5.4. Found (percent): C, 62.2; H, 5.4.

(b) N-aminoxy-acetyl-N'-L-phenylalanyl-hydrazine dihydrobromide

This compound was prepared from 3.0 g. of N-(N''-benzyloxycarbonyl-aminoxy-acetyl)-N'-(N''' - benzyloxycarbonyl-L-phenylalanyl)-hydrazine, as described in Example 1d). 2.17 g. (90%) of N-aminoxy-acetyl-N'-L-phenylalanyl-hydrazine dihydrobromide were obtained; M.P. 143° C.

*Analysis.*—Calculated (percent): Br, 38.6. Found (percent): Br, 38.3.

EXAMPLE 7

(a) N-(N''-tert.-butyloxycarbonyl-α-aminoxy-propionyl)-N'-isonicotinoyl-hydrazine pentachlorophenolate 1.73 g. (3.8 mmol.) of N-tert.-butyloxy-carbonyl-α-aminoxy-propionic acid pentachlorophenyl ester and 0.57 g. (4.2 mmol.) of isonicotinic acid hydrazide are dissolved in 15 ml. of abs. dimethyl formamide and the reaction mixture is allowed to stand overnight. The solvent is then evaporated under reduced pressure and the residue is crystallized from ethyl acetate. 1.46 g. (65%) of N-(N''-tert-butyloxycarbonyl-α-aminoxy - propionyl)-N'-isonicotinoyl hydrazine pentachlorophenolate are obtained. M.P. 154–155° C.; $R_f=0.25$; $[\alpha]_D^{25}=+40.0°$ (c.=1; ethanol).

*Analysis.*—Calculated (percent): C, 40.7; N, 3.4; Cl, 30.1. Found (percent): C, 40.7; N, 3.5; Cl, 30.0.

(b) N-(α-aminoxy-propionyl)-N'-isonicotinoyl-hydrazine-dihydrochloride 1.89 g. (3.2 mmol.) of N-(N''-tert.-butyl-oxycarbonyl-α-aminoxy-propionyl)-N'-isonicotinoyl-hydrazine pentachlorophenolate are suspended in a 4 mol./liter solution of hydrogen chloride in ethyl acetate and the reaction is stirred for 30 minutes. 10 ml. of dry ether are then added to the solution, the precipitate is separated by filtration, washed with ether recrystallized from the mixture of anhydrous ethanol and ether. 0.86 g. (90%) of N-(α-aminoxy-propionyl)-N'-isonicotinoyl hydrazine dihydrochloride are obtained; M.P. 181° C.; $[\alpha]_D^{25}=+36.6°$ (c.=1, ethanol 96%).

*Analysis.*—Calculated (percent): C, 36.4; H, 4.8; Cl, 23.8. Found (percent): C, 36.5; H, 4.8; Cl, 23.8.

EXAMPLE 8

N-(α-aminoxy-β-phenyl-propionyl)-N'-isonicotinoyl hydrazine dihydrochloride

This compound was prepared from 2.4 g. (6 mmol.) of N - (N''-tert.-butyloxycarbonyl-α-aminoxy-β-phenyl-propionyl)-N'-isonicotinoyl hydrazine as described in Example 1(d). 1.85 g. (83%) of N-(α-aminoxy-β-phenyl-propionyl.)-N'-isonicotinoyl hydrazine dihydrochloride were obtained; M.P. 92° C. (methanol/ether); $[\alpha]_D^{25}=+42.0°$ (c.=1, ethanol).

*Analysis.*—Calculated (percent): C, 48.3; H, 4.8; N, 15.0; Cl, 19.0. Found (percent): C, 48.2; H, 5.0; N, 14.9; Cl, 19.2.

EXAMPLE 9

N'-(N''-aminoxy-acetyl)-aminoxy-acetyl-N'-aminoxyacetylhydrazine dihydrochloride 2.22 g. (0.008 mol.) of N-(N'-tert.-butyloxycarbonyl-aminoxy-acetyl)-aminoxy-acetic acid hydrazide are dissolved in 25 ml. of abs. dimethylformamide. 3.07 g. (0.07 mol.) of N-tert.-butyloxycarbonyl-aminoxy-acetic acid pentachlorophenyl ester are added to the reacton mixture, which is stirred for one hour at room temperature and then left to stand for 16 hours. The solvent is then distilled off under reduced pressure, in a water bath of max. 50° C., the residue is dissolved in 30 ml. of ethyl acetate, and the solution extracted three times with 7 ml. of 0.1 N hydrochloric acid solution and subsequently twice with 7 ml. of water. The organic layer is dried over anhydrous sodium sulphate, and the solvent is distilled off. 20 ml. of a 4 mol./liter solution of hydrogen chloride in ethyl acetate are added to the residue, the mixture is stirred for 15 minutes at room temperature; 60 ml. of abs. diethyl ether are then added, the precipitated crystals are collected, washed with diethyl ether, dried over phosphorus pentoxide, and then recrystallized from ethanol/ether. 1.70 g. of N'-(N''-aminoxy-acetyl)-aminoxy-acetyl-N-aminoxy-acetyl-hydrazine dihydrochloride (75%) are obtained; M.P. 176–178° C.; $R_f=0.18$.

*Analysis.*—Calculated (percent): C, 22.2; H, 4.8; N, 21.6; Cl, 21.9. Found (percent): C, 22.2; H, 4.9; N, 21.4; Cl, 22.0.

EXAMPLE 10

(a) N-(N''-tert.-butyloxycarbonyl-DL - α - aminoxy - propionyl) - N' - isonicotinoyl-hydrazine pentachlorophenolate 1.73 g. (0.0038 mol.) of DL-α-tert.-butyloxycarbonyl-aminoxy-propionic acid pentachlorophenyl ester are dissolved in 15.0 ml. of abs. dimethylformamide under stirring at room temperature. 0.57 g. (0.00415 mol.) of isonicotinic acid hydrazide are then added, and the reaction mixture is left to stand for 16 hours. The solvent is then distilled off under reduced pressure at a temperature of max. 50° C., and the residue is recrystallized from ethyl acetate. 2.00 g. (91%) of N-(N''-tert.-butyloxycarbonyl-DI-α-aminoxy-propionyl)-N'-isonicotinoyl-hydrazine pentachlorophenolate are obtained; M.P. 136–138° C.; $R_f=0.22$.

*Analysis.*—Calculated (percent): C, 40.7; H, 3.4; Cl, 30.1. Found (percent): C, 40.7; H, 3.5; Cl, 30.1.

(b) N-DL-α-aminoxy-propionyl-N'-isonicotinoyl-hydrazine dihydrobromide 1.65 g. (0.0027 mol.) N-(N''-tert.-butyloxycarbonyl-DL - α - aminoxy - propionyl)-N'-isonicotinoyl-hydrazine pentachlorophenolate are treated with hydrobromic acid dissolved in glacial acetic acid, as described in Example 1(c). 1.00 g. (95%) of N-DL-α-aminoxy-propionyl-N'-isonicotinoyl-hydrazine dihydrobromide are obtained; M.P. 145–149° C.

*Analysis.*—Calculated (percent): C, 27.9; H, 3.6; N, 14.5; Br, 41.3. Found (percent): C, 27.8; H, 3.7; N, 14.7; Br, 41.2.

EXAMPLE 11

(a) N-(N''-tert.-butyloxycarbonyl-α-aminoxy-propionyl)-N'-(N'''-benzyloxycarbonyl-glycyl)-hydrazine 0.96 g. (0.0043 mol.) of N-benzyloxycarbonyl-glycyl-hydrazine are dissolved in 20 ml. of abs. dimethylformamide under stirring at room temperature. 1.82 g. (0.0040 mol.) of N-tert.-butyloxycarbonyl-aminoxy-propionic acid pentachlorophenyl ester are added to the solution and the mixture is left to stand for 16 hours. The solvent is then distilled off under reduced pressure, the residue is dissolved in 25 ml. of ethyl acetate, the solution washed three times with 5 ml. of N hydrochloric acid, and with 5 ml. of water, the organic layer is dried over anhydrous sodium sulphate, and the solvent is distilled off under reduced pressure. The residue is dissolved in hot ethyl acetate and n-heptane is added until the crystallization of the product is just beginning. After cooling, the precipitated crystals are collected. 1.21 g. (74%) of N - (N'' - tert.-butyloxycarbonyl-α-aminoxy-propionyl)- N' - (N''' - benzyloxycarbonyl-glycyl)-hydrazine are obtained; M.P. 99–100° C.; $[\alpha]_D^{25} = +51°$ (c.=1, ethanol); $R_f = 0.27$.

*Analysis.*—Calculated (percent): C, 52.7; H, 6.4. Found (percent): C, 52.7; H, 6.5.

(b) N-α-aminoxy-propionyl-N'-glycyl-hydrazine dihydrobromide 1.10 g. (0.0027 mol.) of N-(N''-tert.-butyloxy-carbonyl-α - aminoxy-propionyl)-N'-(N'''-benzyloxycarbonyl - glycyl)-hydrazine are treated with hydrobromic acid dissolved in glacial acetic acid, as described in Example 1c). 0.66 g. (91%) of N-α-aminoxy-propionyl-N'-glycyl-hydrazine dihydrobromide are obtained; M.P. 170–175° C., $[\alpha]_D^{25} = +30°$ (c.=0.8, ethanol).

*Analysis.*—Calculated (percent): C, 17.8; H, 4.2; Br, 47.3. Found (percent): C, 1.77; H, 4.3; Br, 47.5.

EXAMPLE 12

(a) N-(N''-tert.-butyloxycarbonyl-α-aminoxy-β-phenyl-propionyl)-N'-isonicotinoyl-hydrazine 3.28 g. (0.0062 mol.) of N-tert.-butyloxycarbonyl-α-aminoxy-β-phenyl-propionic acid pentachlorophenyl ester are dissolved in 20 ml. of abs. dimethylformamide, 0.98 g. (0.0065 mol.) of isonicotinic acid hydrazide are added to the solution and the mixture is left to stand for 16 hours. The solvent is then distilled off under reduced pressure in a water bath of max. 50° C. The residue is dissolved in 25 ml. of ethyl acetate and the ethyl acetate solution is extracted three times with 10 ml. of aqueous N hydrochloric acid. The aqueous extracts are unified, and then neutralized by the addition of solid sodium bicarbonate. The precipitated crystals are collected, washed with water and dried, 2.35 g. (95%) of N-(N''-tert.-butyloxycarbonyl - α - aminoxy - β - phenyl-propionyl)-N'-isonicotinoyl-hydrazin are obtained; M.P. 98–102° C.; $[\alpha]_D^{25} = -67°$ (c.=1, ethanol); $R_f = 0.24$.

*Analysis.*—Calculated (percent): C, 60.0; H, 6.0; N, 14.0. Found (percent): C, 59.9; H, 6.1; N, 13.9.

(b) N-α-aminoxy-β-phenyl-propionyl-N'-isonicotinoyl-hydrazine dihydrobromide 2.00 g. (0.005 mol.) of N-(N''-tert.-butyloxycarbonyl-α-aminoxy - β - phenyl-propionyl)-N'-isonicotinoyl - hydrazine are treated with 20 ml. of a 4 mol./liter solution of hydrobromic acid in glacial acetic acid, as described in Example 1(c). 2.29 g. (99%) of N-α-aminoxy-β-phenyl-propionyl-N'-isonicotinoyl-hydrazine dihydrobromid are obtained; M.P. 168–170° C.; $[\alpha]_D^{28} = -28°$ (c.=1, ethanol).

*Analysis.*—Calculated (percent): C, 39.0; H, 3.9; Br, 34.6. Found (percent): C, 38.9; H, 4.0; Br, 34.6.

EXAMPLE 13

N-(N''-acetyl-DL-α-aminoxy-β-phenyl-propionyl)-N'-isonicotinoyl-hydrazine 3.25 g. (0.0087 mol.) of N-(DL-α-aminoxy-β-phenyl-propionyl) - N' - isonicotinoyl-hydrazine dihydrochloride are dissolved in 20 ml. abs. pyridine. The solution is cooled to 5° C., 2.40 ml. (0.0174 mol.) of triethylamine are added thereto and then 1.24 ml. (0.0174 mol.) of acetyl chloride are added dropwise, under further cooling to the mixture. The reaction is then allowed to warm up to room temperature and stirred for further 20 minutes. 1.20 ml. (0.0087 mol.) of triethylamine are added to the mixture and the stirring is continued for a further hour. The mixture is diluted with 70 ml. of water and extracted three times with ethyl acetate (25 ml. each). The unified ethyl acetate extract is washed with 25 ml. of water, dried over anhydrous sodium sulphate and evaporated to dryness under reduced pressure. The residue is recrystallized from hot ethyl acetate. 1.98 g. (66.5%) of N-(N''-acetyl-DL-α-aminoxy-β-phenyl-propionyl) - N' - isonicotinoyl-hydrazine are obtained; M.P. 173–174° C.; $R_f = 0.43$.

*Analysis.*—Calculated (percent): C, 59.6; H, 5.3; N, 16.4. Found (percent): C, 59.7; H, 5.3; N, 16.3.

EXAMPLE 14

N-(N''-benzoyl-aminoxyacetyl)-N'-isonicotinoyl-hydrazine 7.44 g. (0.20 mol.) of N - aminoxyacetyl-N'-isonicotionoyl-hydrazine dihydrobromide are dissolved in 25 ml. of water and 1.60 g. (0.040 mol.) of solid sodium hydroxide are added under stirring to the solution cooled previously to 5° C. 2.52 g. (0.030 mol.) of solid sodium bicarbonate are then added to the reaction mixture and 3.50 ml. (0.030 mol.) of benzoyl chloride are added dropwise thereto in 30 minutes, while the temperature of the reaction mixture is held at 5° C. The mixture is stirred for further 2 hours at room temperature, the precipitated product is then collected and recrystallized (without previous drying) from water. 5.42 g. (79%) of N-(N''-benzoyl-aminoxyacetyl-N'-isonicotinoyl-hydrazine are obtained; M.P. 155–156° C.; $R_f = 0.35$.

*Analysis.*—Calculated (percent): C, 55.8; H, 4.7; N, 16.3. Found (percent): C, 55.7; H, 4.7; N, 16.2.

What we claim is:

1. N-aminoxy-acetyl - N' - isonicotinoyl-hydrazine and the pharmaceutically acceptable acid addition salts thereof.

References Cited

UNITED STATES PATENTS 3,642,805   2/1972   Kisfaludy et al. __ 260—295 AM

OTHER REFERENCES

Burger: Medicinal Chemistry, Third edition, Part I, Wiley-Interscience, pp. 414–415 (1970).

ALAN L. ROTMAN, Primary Examiner

U.S. Cl. X.R.

260—295.5 A, 453 R; 424—266, 298